H. B. AUCHY.
POWER MECHANISM FOR CAROUSELS.
APPLICATION FILED FEB. 7, 1908.
937,750.
Patented Oct. 26, 1909.
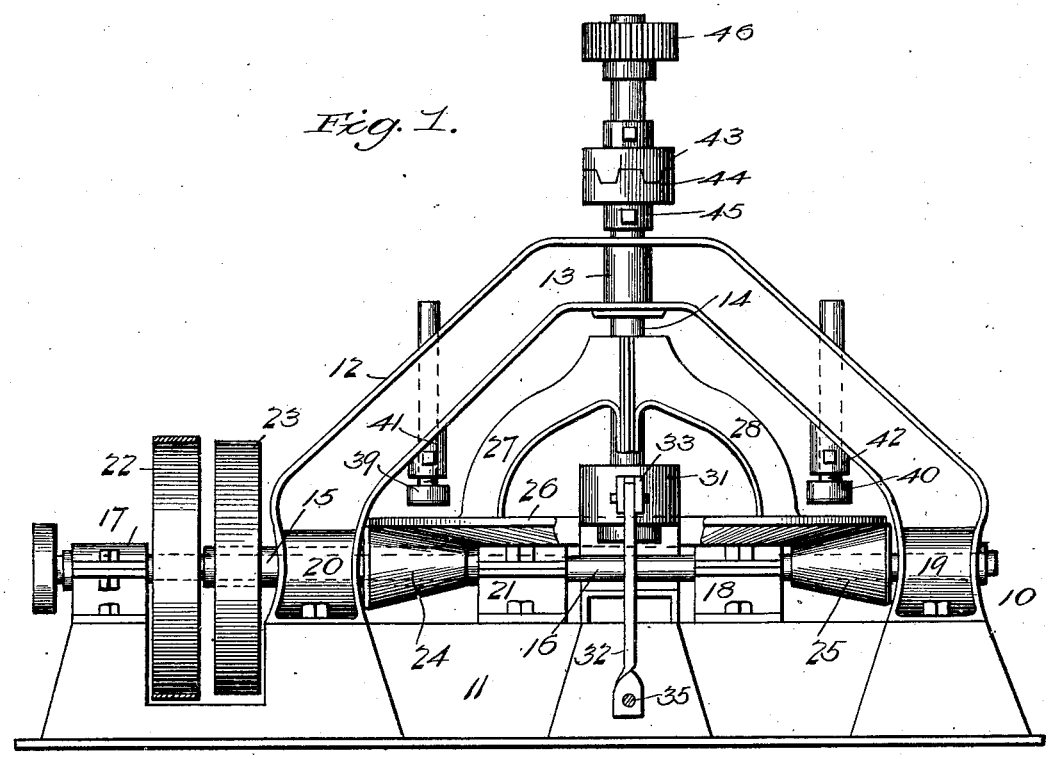
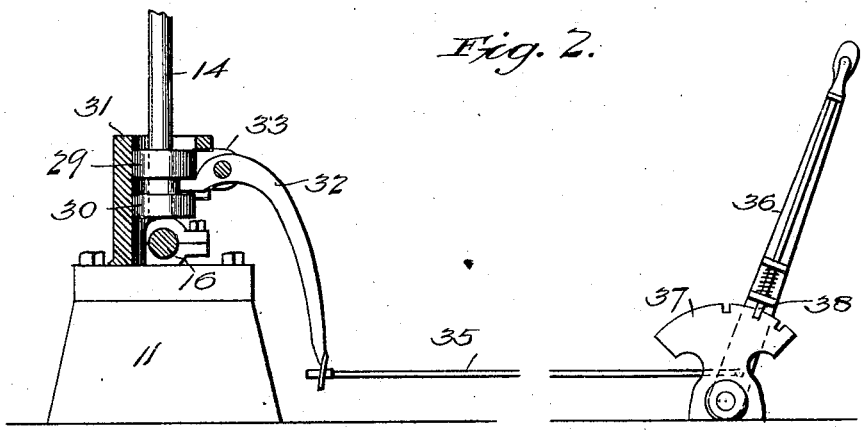
Witnesses
Inventor
H. B. Auchy
By Walter F. Rogers
Attorney

UNITED STATES PATENT OFFICE.

HENRY B. AUCHY, OF PHILADELPHIA, PENNSYLVANIA.

POWER MECHANISM FOR CAROUSELS.

937,750.  Specification of Letters Patent.  Patented Oct. 26, 1909.

Application filed February 7, 1908. Serial No. 414,828.

*To all whom it may concern:*

Be it known that I, HENRY B. AUCHY, a citizen of the United States, residing at Philadelphia, in the county of Philadelphia and State of Pennsylvania, have invented certain new and useful Improvements in Power Mechanism for Carousels; and I do hereby declare the following to be a full, clear, and exact description of the invention, such as will enable others skilled in the art to which it appertains to make and use the same.

My invention relates to improvements in friction power mechanism for carousels. Its object is to provide a power transmitting mechanism which can be readily put into action or thrown out by a single operator from a single controlling device.

To this end it comprises the features in combination as especially set forth in the claims hereto appended.

In the drawings:—Figure 1 is a front elevation of the mechanism with the operating lever handle and rod cut away; Fig. 2 is a detail of the lever rod and handle and dog and other parts for carrying and lifting the vertical power shaft and connected parts.

In the drawings 10 is the frame of the machine which rests upon a bed 11 and bears a yoke 12 in which, at 13, is formed a bearing for the vertical power shaft 14. There are two horizontal power-shafts 15 and 16. The shaft 16 passes through the hollow shaft 15 and is journaled in blocks secured to the bed 11 as indicated at 17 and 18 and also at the outer end in the frame 10 as indicated at 19. The hollow shaft 15 is journaled in the frame at 20 and in a block on the bed 11 as indicated at 21.

22 and 23 are pulleys which drive the two shafts, 22 being secured upon the inner shaft 16 and the pulley 23 upon the hollow shaft 15. Secured upon the hollow shaft 15 is a cone 24 and upon the inner shaft 16 is secured an oppositely directed cone 25. Above these cones and arranged to engage them is a beveled crown-plate 26, which, by means of two yoke brackets 27 and 28 secured together suspend the crown-plate 26 from the vertical power-shaft 14.

At the bottom of the power-shaft are formed or placed two collars 29 and 30 spaced apart and playing in a cylindrical guide-block 31, cut away at the front to receive the jaw of the dog 32. The dog 32 is pivoted to an ear 33 upon the block 31 and is secured at the lower end to a connecting rod 35 leading to a lever handle 36 of the usual construction pivoted to the bed of the machine and operating in conjunction with a lock segment 37 and latch 38.

It will be apparent that the vertical shaft 14 is carried by the dog 32 and that when the lever handle is operated by forcing it, in the illustration, toward the left, the dog 32 operating between the collars 29 and 30 will lift the vertical power-shaft 14 which will carry with it the yoke brackets 27 and 28 and the crown-plate 26.

39 and 40 are brake-heads secured by set screws in hollow supports 41 and 42 which are themselves fixed in the yoke 12.

As indicated in Fig. 1 the vertical power-shaft 14 is in two parts. The upper part has secured at its bottom a clutch member 43 which takes into a clutch face 44 formed on a projecting hub of a ring 45 through which passes the bottom portion of the vertical shaft 14. That is to say, the two parts of the shaft are joined by the usual clutch members secured in the usual manner upon the two parts of the shaft. The vertical shaft 14 also bears at the top the customary pinion 46 which engages and drives the gear of the carousels.

In operation all that is necessary to start the machine is to draw out the lever handle 36 to the position shown in Fig. 2 permitting the vertical power shaft 14 to fall carrying with it the yoke bracket 27 and 28 and the crown-plate 26 until the crown plate lies upon the cones 24 and 25, which are rotated by the application of power to the shafts 15 and 16 by their pulleys, the shafts being oppositely rotated by familiar devices, as for example, by an ordinary belt on the pulley 23 and a twisted belt on the pulley 22.

When it is desired to stop the machine all that is necessary is to operate the same lever handle 36 in the opposite direction so as to lift the vertical power-shaft 14 and carry up the crown-plate 26 until its top face abuts against the brake-heads 39 and 40, bringing the mechanism to rest. The brake-heads, as indicated, are adjustable to regulate the necessary play of the crown-plate and to provide for wear. This apparatus operates directly from one source of power and control and is so compact that the vibrations and the usual noise and jar occasioned by other mechanisms is obviated. At the same time the parts may be readily removed for necessary repairs or adjustments.

What I claim is:—

1. In a friction power-mechanism for carousels, the combination of a pair of concentric power-shafts, a pair of cones carried by the shafts, a power-transmitting shaft, a beveled plate or ring carried by the power-transmitting shaft, and means for lowering and elevating the plate or ring to bring it into or remove it from operative connection with the cones.

2. In a friction power-mechanism for carousels, the combination of a pair of horizontal power-shafts, oppositely directed cones carried by the power-shafts, a vertical power shaft, a beveled crown-plate carried by the vertical power-shaft, and means for lifting the vertical shaft and the crown-plate.

3. In a friction power-mechanism for carousels, the combination of power-shafts, driving-cones carried by the power-shafts, a vertical shaft, a beveled crown-plate carried by the vertical shaft the vertical shaft having a pair of collars at the bottom, a dog lying in the space between the collars, and a lever for operating the dog.

4. In a friction power-mechanism for carousels, the combination of power-shafts, driving cones carried by the power-shafts, a vertical shaft, a beveled crown-plate carried by the vertical-shaft, and a lever-mechanism for controlling or regulating the vertical shaft.

5. In a friction power-mechanism for carousels, the combination of power-shafts, driving-cones carried by the power-shafts, a vertical shaft, a crown-plate borne by the vertical shaft, a frame comprising a yoke and supplying a bearing for the vertical shaft, and brake-heads carried in the frame above the crown-plate.

6. In a friction power-mechanism for carousels, the combination of a pair of horizontal power-shafts, a pair of oppositely turning friction members carried by the horizontal power-shafts, a vertical power-shaft, a friction member carried by the vertical power-shaft, and means for lifting the vertical power-shaft and the attached friction member.

7. In a friction power-mechanism for carousels, the combination of a pair of concentric power-shafts, a cone attached to the inner power-shaft and an oppositely directed cone attached to the outer power-shaft, a power-transmitting shaft, a friction member carried by the power-transmitting shaft for engaging the cones, and means for lowering and elevating the friction member carried by the power-transmitting shaft to bring it into or remove it from operative connection with the cones.

8. In friction driving mechanism, the combination of a frame, a vertical shaft mounted therein, a bevel disk carried by said shaft, a pair of cones in engagement with said disk, a shaft carrying one of said cones, a sleeve carrying the other cone, means for driving said shaft and sleeve in opposite directions whereby the cones serve to drive the disk in one direction, and means for raising and lowering said disk with respect to the cones.

9. In a friction driving mechanism, the combination of a frame, a vertical shaft mounted therein, a bevel disk carried by said shaft, a pair of cones in engagement with said disk, a shaft carrying one of said cones, a sleeve carrying the other cone, means for driving said shaft and sleeve in opposite directions whereby the cones may be driven in one direction, a step bearing supporting the vertical shaft, and means for raising and lowering said step bearing to carry the bevel disk into and out of engagement with the bevel wheels.

10. The combination, in friction driving mechanism, of a vertical shaft, a bevel disk carried thereby, friction cones in engagement with said bevel disk whereby the latter may be driven, means for driving said cones, a step bearing for said vertical shaft, a support for said bearing, a lever carried by said support in engagement with the bearing, and means for operating said lever so as to bring the bevel disk into and out of engagement with the bevel wheels.

11. In friction driving mechanism, the combination of a frame, a vertical shaft mounted therein, a bevel disk carried by said shaft, a pair of friction cones in engagement with said disk for driving the same, said disk having a braking surface opposite the point of engagement by the friction cones, brake shoes carried by the frame, and means for raising said friction disk into contact with the brake shoes.

12. In friction driving mechanism, the combination of a vertically mounted shaft, a bevel disk carried by said shaft, a pair of cones in engagement with said disk, means for driving said cones in opposite directions whereby said shaft may be driven in one direction through the medium of said disk, and means for raising and lowering the disk with respect to the cones.

In testimony whereof I affix my signature, in presence of two witnesses.

HENRY B. AUCHY.

Witnesses:
CHAS. E. RIORDON,
D. V. PIERPOINT.